United States Patent [19]

Adams

[11] 3,777,333
[45] Dec. 11, 1973

[54] SHRIMP CLEANING DEVICE
[76] Inventor: Michael L. Adams, 1312 S. Washington, Park Ridge, Ill. 60068
[22] Filed: Mar. 29, 1972
[21] Appl. No.: 239,157

[52] U.S. Cl. .................................................. 17/72
[51] Int. Cl. ........................................... A22c 29/00
[58] Field of Search ..................... 17/72, 66, 75, 74, 17/73, 69

[56] References Cited
UNITED STATES PATENTS
2,857,620  10/1958  Joseph ..................................... 17/69
3,290,720  12/1966  Gordon .................................... 17/69
3,353,207  11/1967  Weinberger ........................... 17/69

Primary Examiner—Robert Peshock
Attorney—Axel A. Hofgren et al.

[57] ABSTRACT

A shrimp cleaning device that deveins, separates the shell from and butterflies shrimp in a single operation including a handle portion that may be grasped by the operator, an arcuate deveining projection having an expanding width for shell separation, a slanted cutting blade fixed to the deveining projection and extending downwardly therefrom for cutting the shrimp meat longitudinally, and an arcuate guide portion below the deveining projection and having the other end of the blade fixed thereto for guiding the shrimp as it passes down the deveining projection and through the cutting blade.

6 Claims, 5 Drawing Figures

PATENTED DEC 11 1973 3,777,333
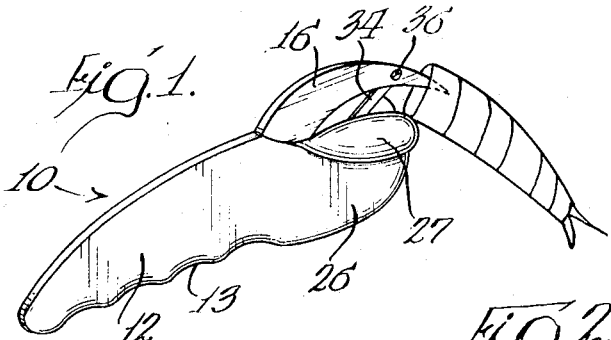
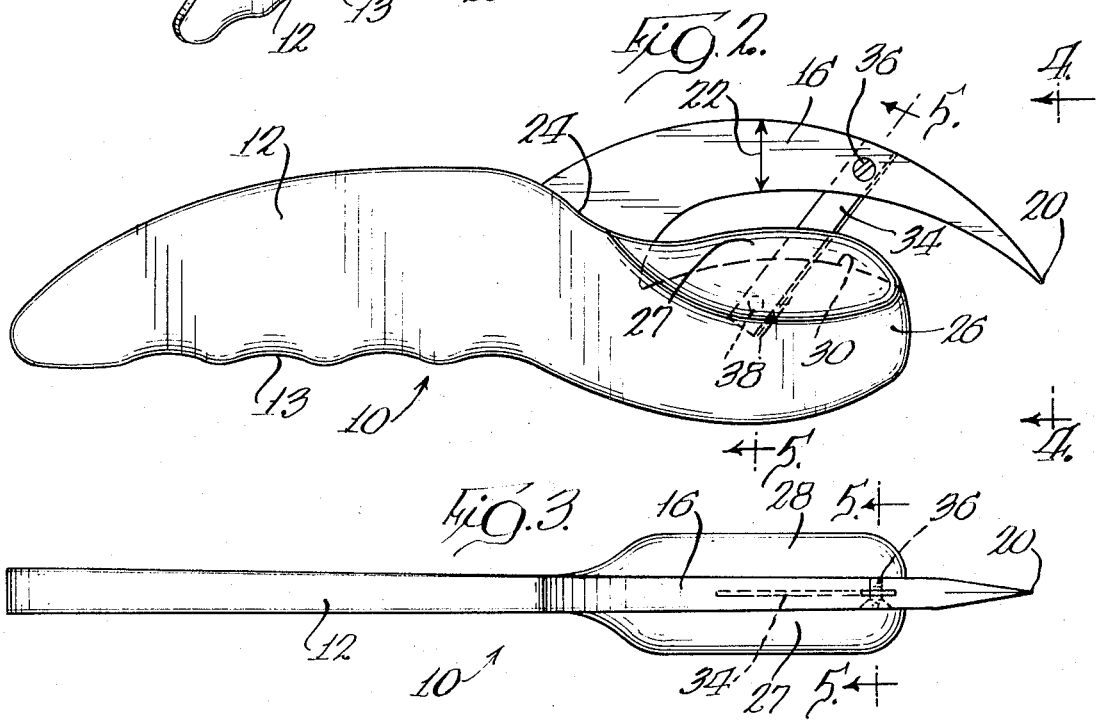
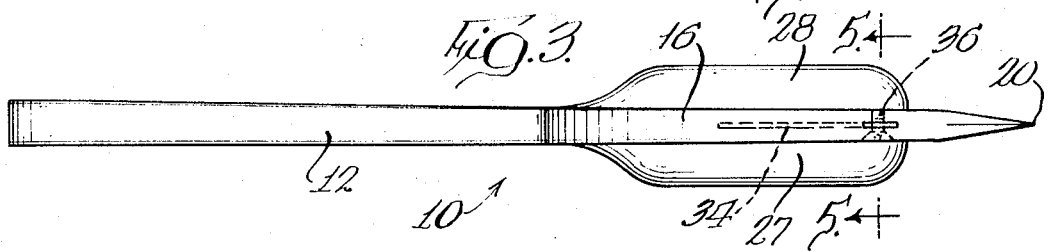
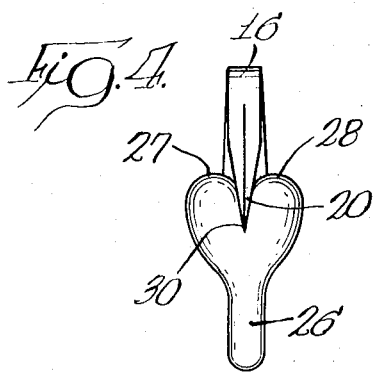
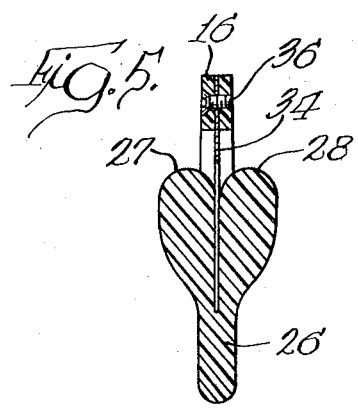

SHRIMP CLEANING DEVICE

BACKGROUND OF THE PRESENT INVENTION

There have in the past been provided a plurality of manually operated implements for deveining shrimp and also for shell separation.

One such device is an integral plastic instrument that has an elongated curved projection on its forward end that is insertable between the meat and the back shell portion of the shrimp and then forced between the two to scrape the vein from the shrimp meat. This prior device is also provided with an expanded portion that serves to separate the shell from the meat.

A primary disadvantage in this prior construction, and others of which applicant is aware, is that it requires an additional separate and tedious cutting operation for the purpose of either cutting the shrimp in half or butterflying the shrimp.

SUMMARY OF THE PRESENT INVENTION

In accordance with the present invention, a single shrimp manipulating implement is provided that simultaneously deveins, separates the shell, and longitudinally cuts the meat of a shrimp. This is accomplished through the provision of a handle portion having a generally arcuate deveining projection extending forwardly therefrom. The projection has a tip that is inserted between the back shell and the meat of the shrimp and inserted therebetween to devein the shrimp. This projection has an expanding width so that the shell is separated from the meat as the shrimp is forced longitudinally onto the projection. Extending downwardly and somewhat rearwardly from the projection is a thin cutting blade for the purpose of longitudinally cutting the shrimp meat simultaneously with the deveining and deshelling operations.

An additional and very important feature of the present invention is the provision of a guide portion extending generally parallel with the deveining projection for the purpose of both supporting and protecting the cutting blade, and providing a guide for the shrimp as it passes over the deveining projection and through the cutting blade. The guiding function of this guide portion facilitates the manual movement of the shrimp through the implement and assures that the cutting blade will cut the shrimp into even halves. Moreover, the guide portion provides a safety feature in that it protects the user's hands to a great extend from the exposed portions of the cutting blade.

BRIEF DESCRIPTION OF THE DRAWINGS

FIG. 1 is a perspective view of a shrimp manipulating instrument according to the present invention;

FIG. 2 is a side elevation view of a shrimp manipulating implement;

FIG. 3 is a top view of the shrimp instrument shown in FIG. 1;

FIG. 4 is an end view of the instrument shown in FIG. 3; and

FIG. 5 is a cross-section taken generally along line 5—5 of FIG. 3.

DETAILED DESCRIPTION OF THE PREFERRED EMBODIMENT

Viewing the drawings and particularly FIGS. 1, 2, and 3, a shrimp manipulating instrument 10 is illustrated having a handle portion 12 with finger grips 13 to facilitate holding of the instrument by the operator. It should be understood that this shrimp instrument deveins, separates the shell from the meat and cuts the shrimp longitudinally all in one simultaneous manual operation.

Projection forwardly from the body 10 is a thin deveining projection 16 having a generally arcuate shape with a point 20. The deveining projection has an increasing width designated generally by arrow 22 in FIG. 2 going from the point 20 towards rear end 24 of the projection 16. This increasing width is for the purpose of separating the shell from the shrimp itself as the point 20 and the projection 16 are inserted between the meat and the back shell of the shrimp along the vein and the shrimp is pushed rearwardly along the projection 16.

For the purpose of guiding the shrimp as it passes over the deveining and shell separating projection 16, a guide 26 is provided having arcuate surfaces 27 and 28 shown clearly in FIGS. 4 and 5 that engage the lower portion of the shrimp as it is fed along the projection 16. These portions 27 and 28 are generally arcuate in configuration as shown in FIG. 2 and mate at a juncture line 30 which is also arcuate as shown in FIGS. 2 and 5.

In addition to guiding the shrimp through the deveining projection 16, the guide portion 26 serves as a lower support for a cutting blade 34. It is fixed at its lower end 36 to the projection 16 and at its lower end upper end 36 to the projection 16 and at its lower end 38 to the guide 26. The cutting blade is slanted rearwardly from the projection 16 to the body portion 26 and serves to cut the shrimp longitudinally as it is fed manually through the implement. It should be understood that the guide portion 26 serves as a safety guide for the operator's hands and fingers as well as serving as a support for the blade, and a guide for the shrimp as they pass down the projection 16 and through the cutting blade 34.

With the exception of the cutting blade 34, the body 10 including projection 16 and guide portion 26 may be an integral plastic molding.

I claim:

1. A shrimp cleaning and cutting device, comprising: a body member, a deveining projection extending from said body member, said body member having an arcuate guide portion extending generally parallel to and spaced below the deveining projection, and a cutting blade for cutting the shrimp longitudinally, fixed at one end to the deveining projection and fixed at the other end to the guide portion, said guide portion being constructed so that the shrimp meat passes between the projection and the guide and severs completely therethrough.

2. A shrimp cleaning and cutting device according to claim 1, wherein said deveining projection is generally arcuate and has an increasing width moving away from the end thereof to remove the meat from the shell of the shrimp.

3. A shrimp cleaning and cutting device according to claim 1, wherein said guide portion has a generally arcuate shape, said deveining projection having a generally arcuate shape, said guide portion being shaped to guide the shrimp through the cutting blade.

4. A shrimp cleaning and cutting device according to claim 3, wherein said cutting blade is slanted rearwardly from the deveining projection to the guide portion.

5. A shrimp cleaning and cutting device according to claim 2, wherein said guide portion is generally "V" shaped in cross-section.

6. A shrimp cleaning and cutting device, comprising: a body member, a deveining projection extending from said body member, said body member having an arcuate guide portion extending generally parallel to and spaced below the deveining projection, and a cutting blade for cutting the shrimp longitudinally, fixed at one end to said body member and fixed at the other end to the guide portion, said guide portion being constructed so that the shrimp meat passes between the projection and the guide, and the shrimp is cut.

* * * * *